(12) United States Patent
Wu et al.

(10) Patent No.: US 10,616,550 B1
(45) Date of Patent: Apr. 7, 2020

(54) GENERATING A REPRESENTATION OF AN OBJECT FROM DEPTH INFORMATION DETERMINED IN PARALLEL FROM IMAGES CAPTURED BY MULTIPLE CAMERAS

(71) Applicant: Facebook Technologies, LLC, Menlo Park, CA (US)

(72) Inventors: Chenglei Wu, Pittsburgh, PA (US); Shoou-I Yu, Pittsburgh, PA (US)

(73) Assignee: Facebook Technologies, LLC, Menlo Park, CA (US)

( * ) Notice: Subject to any disclaimer, the term of this patent is extended or adjusted under 35 U.S.C. 154(b) by 26 days.

(21) Appl. No.: 16/131,660

(22) Filed: Sep. 14, 2018

(51) Int. Cl.
| | | |
|---|---|---|
| *H04N 7/18* | (2006.01) |
| *H04N 13/128* | (2018.01) |
| *H04N 5/247* | (2006.01) |
| *G06T 7/55* | (2017.01) |
| *G06K 9/62* | (2006.01) |
| *G06K 9/46* | (2006.01) |
| *G06T 1/20* | (2006.01) |
| *G06T 7/507* | (2017.01) |
| *G06T 7/514* | (2017.01) |
| *G06T 15/50* | (2011.01) |
| *H04N 5/225* | (2006.01) |
| *H04N 13/00* | (2018.01) |

(52) U.S. Cl.
CPC ......... *H04N 13/128* (2018.05); *G06K 9/4647* (2013.01); *G06K 9/6215* (2013.01); *G06T 1/20* (2013.01); *G06T 7/507* (2017.01); *G06T 7/514* (2017.01); *G06T 7/55* (2017.01); *G06T 15/506* (2013.01); *H04N 5/247* (2013.01); *G06T 2207/10048* (2013.01); *G06T 2207/20221* (2013.01); *H04N 5/2256* (2013.01); *H04N 2013/0081* (2013.01)

(58) Field of Classification Search
CPC . G06T 2207/10021; G06T 2207/10012; G06T 2207/10052; H04N 5/247; H04N 7/181
USPC ................ 348/135, 136, 137, 139, 142, 143
See application file for complete search history.

(56) References Cited

U.S. PATENT DOCUMENTS

| | | | |
|---|---|---|---|
| 9,386,297 B2 * | 7/2016 | Nagasaka | H04N 9/045 |
| 2014/0139641 A1 * | 5/2014 | Holz | G06K 9/3233 |
| | | | 348/47 |
| 2017/0098322 A1 * | 4/2017 | Ono | G09G 5/00 |

* cited by examiner

*Primary Examiner* — Robert Chevalier
(74) *Attorney, Agent, or Firm* — Fenwick & West LLP

(57) ABSTRACT

Multiple cameras with different orientations capture images of an object positioned at a target position relative to the cameras. Images from each camera are processed in parallel to determine depth information from correspondences between different regions within an image captured by each image capture device in parallel. Depth information for images from each camera is modified in parallel based on shading information for the images and stereoscopic information from the images. In various embodiments, the depth information is refined by minimizing a total energy from intensities of portions of the images having a common depth and intensities of portions of the image from shading information from images captured by multiple cameras. The modified depth information from multiple images is combined to generate a reconstruction of the object positioned at the target position.

20 Claims, 3 Drawing Sheets

GENERATING A REPRESENTATION OF AN OBJECT FROM DEPTH INFORMATION DETERMINED IN PARALLEL FROM IMAGES CAPTURED BY MULTIPLE CAMERAS

BACKGROUND

The present disclosure generally relates to configurations including multiple cameras directed towards a target position, and more specifically relates to generating a three-dimensional reconstruction of an object positioned at the target position from images captured by the multiple cameras.

Increasing resolutions of cameras has increased proliferation of three-dimensional vision systems. In a three-dimensional vision system, images of an object are captured by one or more cameras. The captured images are provided to a computing device, which analyzes the images to generate a three-dimensional graphical reconstruction of the object.

However, combining images of different views of an object to generate the three-dimensional graphical reconstruction of the object is computationally intensive. This use of computational resources increases the time to generate the graphical reconstruction of the object. Increased time to generate the graphical reconstruction of the object limits potential use of three-dimensional vision systems to implementations that are tolerant of delays from image capture to generation of graphical reconstructions of objects.

SUMMARY

To capture image or video data of an object to be reproduced in a virtual reality (VR) environment or in an augmented reality (AR) environment, multiple cameras are positioned to focus on a target position where the object is positioned. The cameras have specific locations relative to each other and relative to the target position. This allows each camera to capture a different image of the object positioned at the target position. Each camera is coupled to a console that receives images of the object positioned at the target position from each camera. The console processes the received images to generate a graphical representation of the object positioned at the target position.

To generate the graphical representation of the object positioned at the target position, the console processes images from each camera in parallel to determine depth information. For example, different processors apply a patch-match process on a graphics processing unit (GPU) to images captured by different cameras at a common time. To improve the convergence and also reduce the computation time, a coarse-to-fine patch-match process is applied to images captured by different cameras at a common time; in various embodiments, the patch-match process is first applied to a coarse resolution of images captured by different cameras at the common time, and fine resolution of the images captured at the common time is initialized to run the patch-match process with fewer iterations. To improve the accuracy of the determined depth information, the console modifies the depth information determined for images received from each camera. In various embodiments, the console modifies depth information determined for various images by optimizing an energy function based on intensities from stereoscopic information and intensities from shading information for various images. For example, for images received from multiple cameras (e.g., from each camera) at a common time, the console determines global intensities for portions of the images corresponding to a common depth, based on the depth information determined for different images. For example, the console determines global intensities for portions of images received from different cameras as an average intensity for portions of images received from different cameras at a common time that have common depth information or having depth information within a threshold amount of each other. Additionally, the console determines intensities for different portions of an image received from a camera received at the common time based on the computed shading information from the image. The console generates a total energy for the image received from the camera at the common time by combining the global intensities of different portions of the images received from different cameras at the common time with intensities determined from shading information for different portions of the image received from the camera at the common time; in various embodiments, the console sums the global intensities of different portions of the images received from different cameras at the common time with the intensities determined from shading information for different portions of the image received from the camera at the common time. In various embodiments, the console sums the intensity differences between the global intensities of different portions of the images received from different cameras at the common time and the intensities computed from the shading information from the corresponding images. The console may also combine a regularization value with the depth estimation for portions of the image with depth estimation of the corresponding neighboring portions of the image received from the camera; the regularization value accounts for similarities between depth estimation of portions of the image that are adjacent to each other.

For each of the images received from different cameras at a common time, the console modifies the depth information determined for the images by minimizing the total energy for each image received at the common time. The console minimizes the total energy for each image received at the common time in parallel using any suitable process or processes. For example, the console applies a Gauss-Newton method using a graphics processing unit (GPU) to an image received from each camera at the common time to minimize the total energy for each image received at the common time, which modifies depth information determined for images received from various cameras. The console combines modified depth information from multiple images to generate a reconstruction of the object positioned at the target position.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
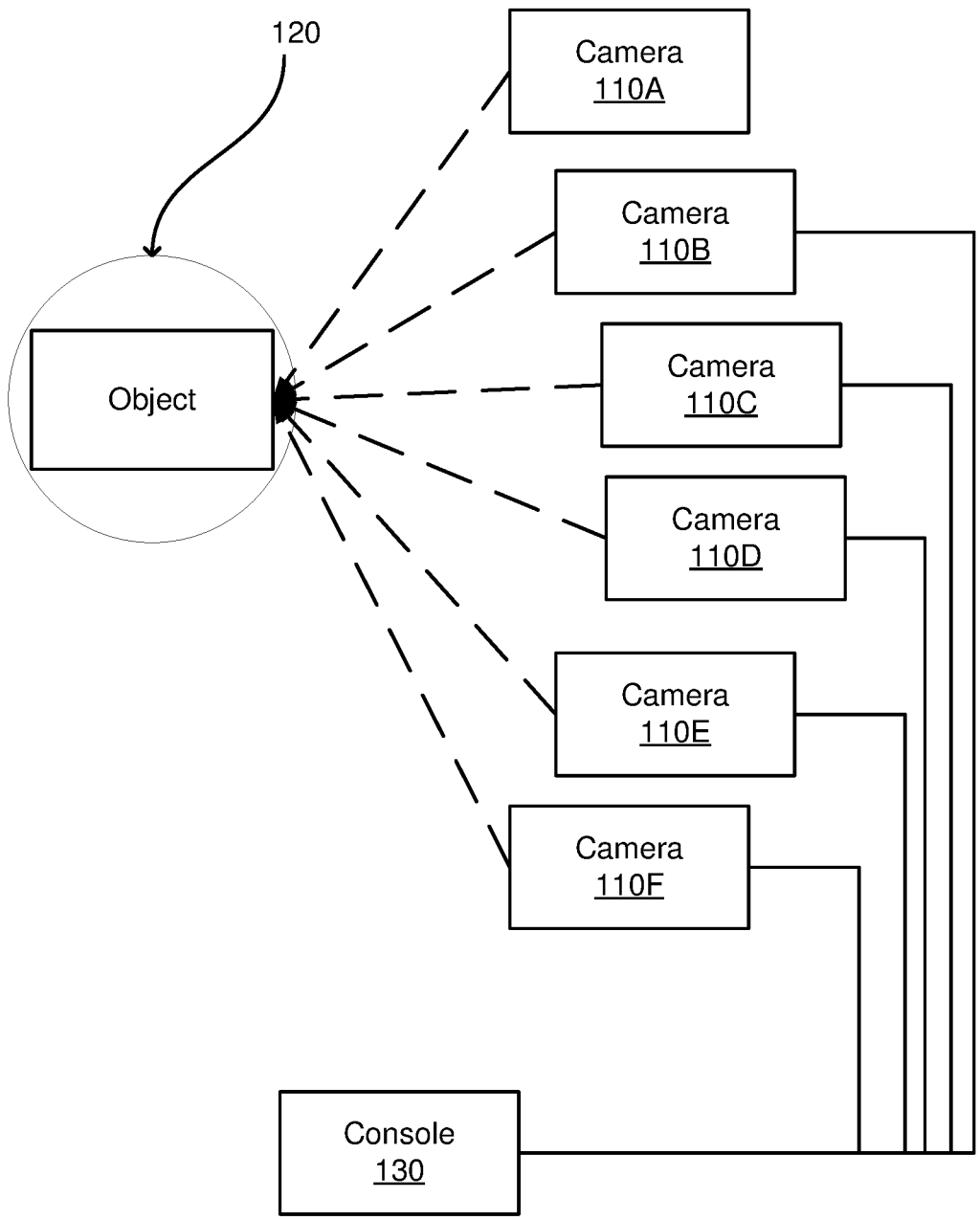
FIG. 1 is a block diagram of a system environment including multiple cameras configured to capture images of an object at a target location, in accordance with an embodiment.

FIG. 1 is a block diagram of a system environment 100 comprising multiple cameras 110A-F configured to capture images of an object positioned at a target position 120. Each of the cameras 110A-F is coupled to a console 130. In other embodiments, any suitable number of cameras 110A-F are included in the system environment 130. Further, in other embodiments, different and/or additional components may be included in the system environment 100.

Each camera 110A-F captures images of an object positioned at the target position 120. Accordingly, each camera 110A-F is configured to have a focal point of, or within, the target position 120. Additionally, each camera 110A-F has a specific position relative to each other camera 110A-F of the system environment 130. For example, camera 110A has a specific position relative to camera 110B as well as a specific position relative to camera 110D. The different positions of the cameras 110A-F relative to each other causes each camera 110A-F to capture images of different portions of the object positioned at the target position 120. In various embodiments, the cameras 110A-F are positioned relative to each other so each camera 110A-F still has overlapping fields of view including different portions of the object positioned at the target position 120.

Each camera 110A-F captures images based on light having different wavelengths reflected by the object positioned at the target position 120. In some embodiments, each camera 110A-F captures images of light within a common wavelength range reflected by the object positioned at the target position 120. For example, each camera 110A-F captures infrared light reflected by the object positioned at the target position 120. As another example, each camera 110A-F captures visible light reflected by the object positioned at the target position. Alternatively, different cameras 110A-F capture light with different ranges of wavelengths reflected by the object positioned at the target position 120. For example, cameras 110A, 110C, 110E capture infrared light reflected by the object positioned at the target position 120, while cameras 110B, 110D, 110F capture visible light reflected by the object positioned at the target position 120. Each camera 110A-F has parameters such as focal length, focus, frame rate, ISO, sensor temperature, shutter speed, aperture, resolution, etc.; one or more parameters of a camera 110A-F may be modified. In some embodiments, the cameras 110A-F have a high frame rate and high resolution. The cameras 110A-F capture two-dimensional images of the object positioned at the target position 120 in various embodiments. In some embodiments, the cameras 110A-F capture two-dimensional images of the object positioned at the target position 120.

In some embodiments, one or more illumination sources are positioned relative to the cameras 110A-F and the target position 120. The one or more illumination sources are positioned to illuminate the target position 120, allowing illumination of an object positioned at the target position. Illumination sources may be positioned at discrete locations relative to one or more of the cameras 110A-F. Alternatively, illumination sources are coupled to one or more of the cameras 110A-F. Example illumination sources include light-emitting diodes (LEDs) that emit light in the visible band (i.e., ~380 nm to 750 nm), in the infrared (IR) band (i.e., ~750 nm to 1 mm), in the ultraviolet band (i.e., 10 nm to 380 nm), in some other portion of the electromagnetic spectrum, or in some combination thereof. In some embodiments, different illumination sources have different characteristics. As an example, different illumination sources emit light having different wavelengths or different temporal coherences describing correlation between light waves at different points in time. Further, light emitted by different illumination sources may be modulated at different frequencies or amplitudes (i.e., varying intensity) or multiplexed in a time domain or in a frequency domain.

The one or more illumination sources are coupled to the console 130, which provides control signals to the one or more illumination sources. For example, the console 130 provides an illumination source with a control signal that modifies an intensity of light emitted by the illumination sources. As another example, the console 130 provides an illumination source with a control signal that modifies a direction in which the illumination source emits light or modifies focusing of light emitted by the illumination source.

The console 130 is a computing device coupled to each of the cameras 110A-F and configured to receive images captured by one or more of the cameras 110A-F. Additionally, the console 130 is configured to transmit control signals to one or more cameras 110A-F that modify one or more parameters of a camera. For example, a control signal provided to a camera 110A from the console 130 modifies a focal point of the camera 110A or modifies a zoom of the camera 110A.

Additionally, the console 130 receives images captured from multiple cameras 110A-F and generates a reconstruction of an object positioned at the target position 120 and included in images received from multiple cameras 110A-F. When generating the reconstruction of the object 120, the console 130 processes images received from multiple cameras 110A-F in parallel. As further described below in conjunction with FIGS. 2 and 3, the console 130 determines depth information from various images based on correspondences between regions within from images captured by different cameras 110A-F in parallel and determines shading information in images captured by different cameras 110A-F in parallel. Using the shading information, the console 130 refines depth information determined from the correspondences in parallel. When refining depth information determined from an image, the console 130 optimizes a total energy of the image, with the energy based on intensities determined from shading information of portions of images captured by various cameras 110A-F having a common depth and intensities of portions of the images captured by various cameras 110A-F determined from shading information. In various embodiments, the console 130 refines depth information from an image by minimizing a total energy of the image based on the intensities of portions of images captured by various cameras 110A-F having a common depth and intensities of portions of the images captured by various cameras 110A-F determined from shading information, as further described below in conjunction with FIGS. 2 and 3. The console 130 combines refined depth information from multiple images to generate a reconstruction of the object positioned at the target position 120.

Figure 2:
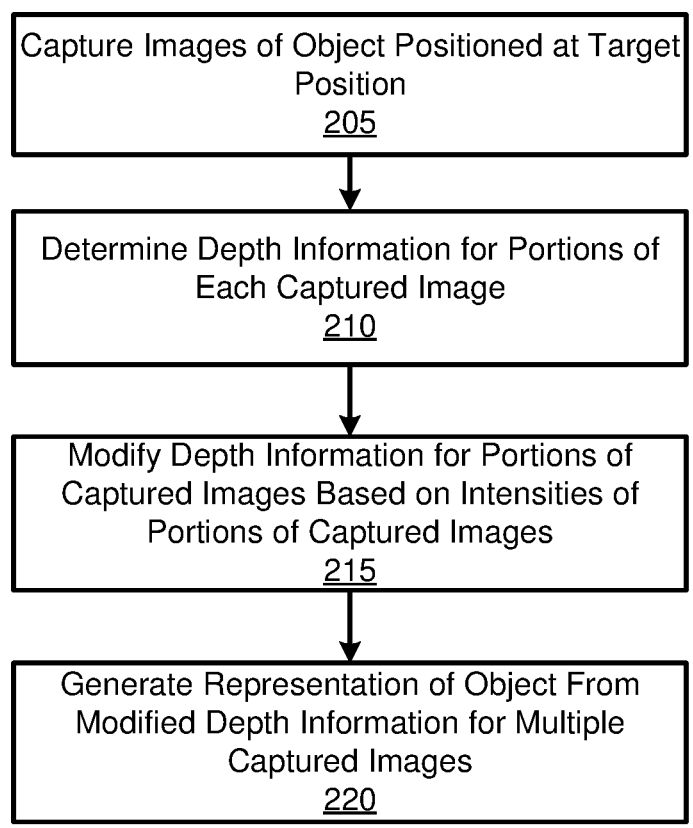
FIG. 2 is a flowchart of a method for generating a representation of an object from images of the object captured by multiple cameras in different locations relative to each other, in accordance with an embodiment.

Generating a Combined Image of an Object from Images Captured by Multiple Cameras FIG. 2 is a flowchart of one embodiment of a method for generating a representation of an object from images of the object captured by multiple cameras 110A-F in different locations relative to each other. In various embodiments, the method may include different or additional steps than those described in conjunction with FIG. 2. Additionally, the method may perform steps in different orders than the order described in conjunction with FIG. 2 in various embodiments.

Multiple cameras 110A-F are positioned at locations relative to each other and positioned to capture images of an object positioned at a target position 120. This allows different cameras 110A-F to capture images of different portions of the object positioned at the target position 120. As further described in conjunction with FIG. 1, each camera 110A-F has one or more parameters that affect capturing of images by the cameras 110A-F.

Each of at least a set of the multiple cameras 110A-F capture 205 images of an object positioned at the target position 120. As further described above in conjunction with FIG. 1, the positioning of different cameras 110A-F relative to each other causes different cameras 110A-F to capture 205 images of different portions of the object positioned at the target position 120. In various embodiments, each of the multiple cameras 110A-F captures 205 one or more images of the object positioned at the target position 120.

The console 130 receives images of the object positioned at the target position 120 from various cameras 110A-F and determines 210 depth information of portions of each received image. The console 130 determines 210 depth information for images received 205 from each camera 110A-F in parallel. For example, the console 130 includes multiple processors, such as graphics processing unit, and each processor determines 210 depth information for an image received 205 from a camera 110A-F. For example, each processor included in the console 130 corresponds to a camera 110A-F, so a processor determines 210 depth information for an image received 205 from a camera 110A-F corresponding to the processor. In various embodiments, the console 130 receives images from multiple cameras 110A-F at a common time, and the console 130 determines 210 depth information for images received from multiple cameras 110A-F at the common time in parallel. Determining depth information for images received from multiple cameras 110A-F in parallel allows the console 130 to more quickly determine depth information for multiple images. In various embodiments, the console 130 initializes a random depth for each pixel in an image received from each camera 110A-F at a common time and defines nearest neighbor fields of pixels that are within a threshold distance of particular pixels in an image received from a camera 110A-F. A depth of a pixel in an image received from a camera 110A-F determined to have at least a threshold accuracy is subsequently propagated to adjacent pixels. Subsequently, candidate depths are evaluated, and the depth of the pixel is modified to a candidate depth resulting in an increased accuracy. The preceding steps are iteratively applied to an image received from a camera 110A-F in various embodiments. For example, the console iteratively performs the preceding steps a set number of times (e.g., 4 times) for each image. In various embodiments, the console 130 applies a coarse to fine patch-match process to images received from various cameras 110A-F to determine 210 depth information corresponding to different pixels in each image. Applying the patch-match process to images captured by different cameras 110A-F in parallel allows the console 130 to more efficiently obtain depth information from multiple images.

To improve the accuracy of the determined depth information, the console 130 modifies 215 the depth information determined 210 for images received 205 from each camera 110A-F. In various embodiments, the console 130 modifies 215 depth information determined 210 for various images by optimizing an energy function based on intensities from stereoscopic information and intensities from shading information for various images. For example, for images received from multiple cameras 110A-F (e.g., from each camera 110A-F) at a common time, the console 130 determines global intensities for portions of the images corresponding to a common depth, based on the depth information determined 210 for different images. For example, the console 130 determines global intensities for portions of images received from different cameras 110A-F as an average intensity for portions of images received from different cameras 110A-F at a common time that have common depth information or having depth information within a threshold amount of each other. Additionally, the console 130 determines intensities for different portions of an image received from a camera 110A-F received at the common time based on shading information from the image. The console 130 sums the intensity differences between the global intensities of different portions of the images received from different cameras 110A-F at the common time and the intensities computed from the shading information from different cameras 110A-F at the common time. The console 130 may also combine a regularization value with a depth estimation for portions of the image with depth estimation of the corresponding neighboring portions of the image received from the camera; the regularization value accounts for similarities between depth estimation of portions of the image that are adjacent to each other.

For each of the images received from different cameras 110A-F at a common time, the console 130 modifies 215 the depth information determined 210 for the images by minimizing the total energy for each image received at the common time. The console 130 minimizes the energy total energy for each image received at the common time in parallel using any suitable process or processes. For example, the console 130 applies a Gauss-Newton method via a graphics processing unit (GPU) to an image received from each camera 110A-F at the common time to minimize the total energy for each image received at the common time, which modifies 215 depth information determined 210 for images received from various cameras 110A-F. However, in other embodiments, the console 130 may apply any suitable process or processes to the total energy determined for images received from different cameras 110A-F at the common time that minimizes a total energy for each received image to modify 215 depth information determined 210 for each of the images received at the common time.

From the modified depth information for images received from multiple cameras 110A-F at the common time, the console 130 generates 220 a representation of the object positioned at the target position at the common time. In various embodiments, the console 130 applies any suitable method or methods to the modified depth information for each image received at the common time that combines the modified depth information in each image into a single-three dimensional representation of the object at the common time. For example, the console 130 performs a Poisson reconstruction from the modified depth information for each image received at the common time to generate 220 the representation of the object at the common time. The console 130 may subsequently present the representation of the object via a display device, store the representation of the object, transmit the representation of the object to a client device for presentation, or perform any other suitable interaction with the representation of the object. In various embodiments, the console 130 generates 220 multiple representations of the object based on modified depth information for images received from multiple cameras 110A-F at different common times and maintains a series of representations of the object. For example, the series of representations correspond to an appearance of the object during a time interval, allowing the series of representations to depict changes in appearance of the object during the time interval or to depict movement of the object during the time interval. The series of representations of the object may be subsequently displayed via a display device, stored by the console 130, or transmitted from the console 130 to a client device in various embodiments. However, the console 130 may perform any suitable action regarding the series of representations of the object in various embodiments.

Figure 3:
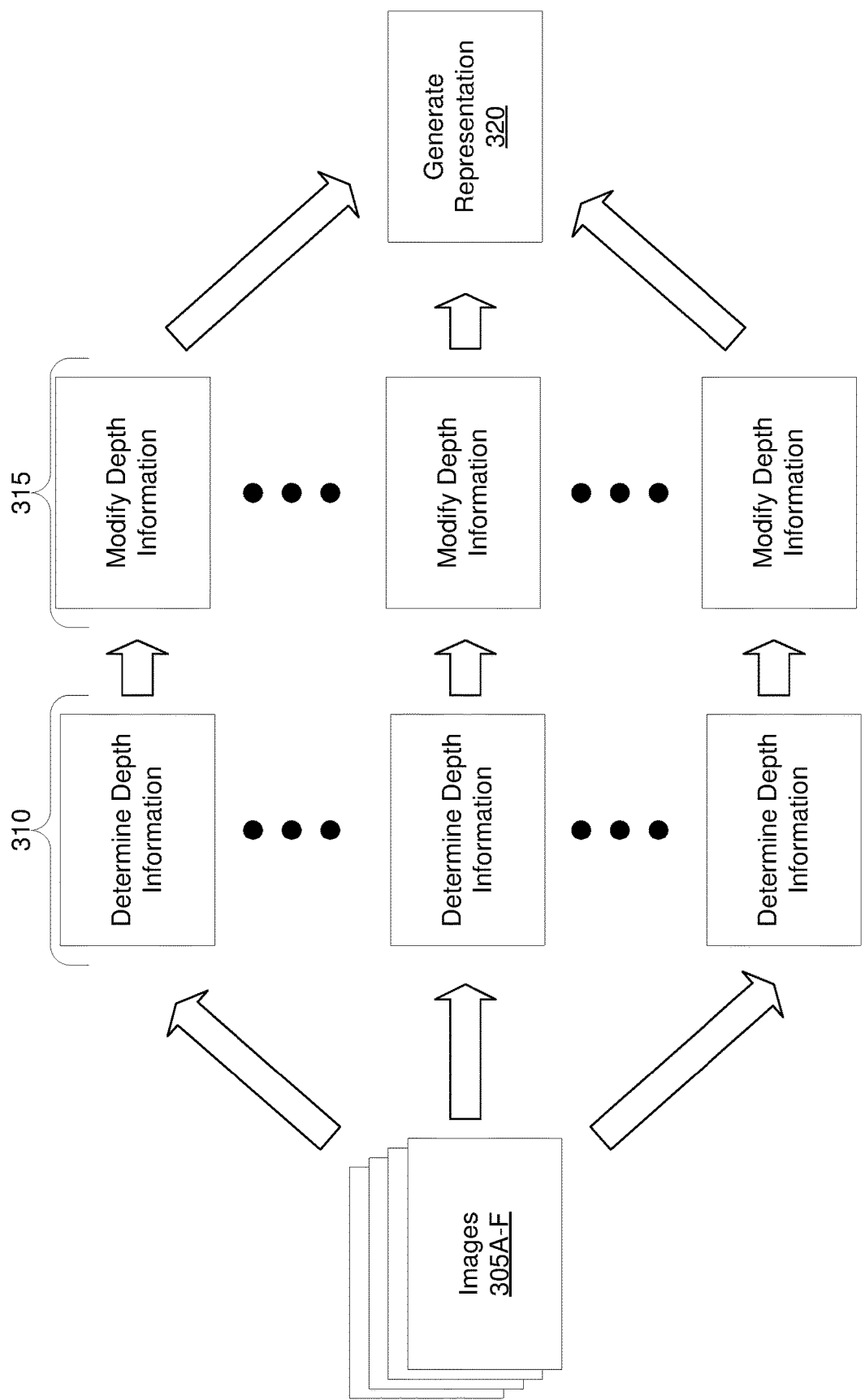
FIG. 3 is a process flow diagram of generating a representation of an object from images of the object captured by multiple cameras in different locations relative to each other, in accordance with an embodiment.

FIG. 3 is a process flow diagram of generating a representation of an object from images of the object captured by multiple cameras 110A-F in different locations relative to each other. As further described above in conjunction with FIGS. 1 and 2, multiple cameras 110A-F capture images 305A-F of an object positioned at a target location 120. Different cameras 110A-F capture images 305A-F of different portions of the object positioned at the target position 120. A console 130 receives the images 305A-F from multiple cameras 110A-F and determines 310 depth information from each image 305A-F in parallel. As further described above in conjunction with FIG. 2, the console 130 may perform any suitable method or methods to determine 310 depth information from an image 305A-F. In various embodiments, the console 130 includes multiple processors (e.g., graphics processing units), and each processor determines 310 depth information from a different received image in parallel. For example, each image 305A-F includes a timestamp, and the console identifies images 305A-F having a common timestamp; different images 305A-F having the common timestamp are processed by different processors of the console 130 in parallel to determine 310 depth information for different images having the common timestamp in parallel.

The console 130 also modifies 315 the depth information determined 310 from each image 305A-F in parallel. In various embodiments, the console 130 maintains an energy function that determines an energy of each image 305A-F based on intensity information of portions of an image 305A-F with a particular timestamp and intensity information of portions of other images 305A-F having the particular timestamp. An example of modifying 315 depth information determined 310 from each image 305A-F is further described above in conjunction with FIG. 2. Different processors included in the console 130 modify 315 the depth information determined 310 from each image 305A-F in parallel; for example, each processor modifies 315 depth information determined 310 from a different image 305A-F. By determining 310 and modifying 315 depth information from multiple images 305A-F in parallel, the console 130 more quickly and efficiently obtains and refines depth information from various images 305A-F.

Using the modified depth information from multiple images 305A-F, the console 130 generates 320 a representation of the object included in the captured images 305A-F. In various embodiments, the representation is a three-dimensional representation of the object included in the images 305A-F generated 320 by combining the images 305A-F and modified depth information for the images 305A-F. As the depth information is determined and modified in parallel for multiple images, overall time for the console 130 to generate 320 the representation of the object is decreased, while the parallel modification of depth information for multiple images increase accuracy of the representation.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Embodiments of the disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A system comprising:
   a plurality of cameras each having a specific position relative to each other and configured to capture images of an object positioned at a target position; and
   a console coupled to each of the plurality of cameras, the console configured to:
      receive one or more images of the object from each of the plurality of cameras,
      determine depth information for images received from each of the plurality of cameras in parallel;
      modify depth information determined for the images received from each of the plurality of cameras at a common time in parallel based on intensities of portions of each image having a common depth and intensities of portions of each image determined from shading information from each image; and
      generate a reconstruction of the object by combining the modified depth information for the images received from each of the plurality of cameras.

2. The system of claim 1, wherein modify depth information determined for the images received from each of the plurality of cameras at a common time in parallel based on intensities of portions of each image having a common depth and intensities of portions of each image determined from shading information from each image comprises:
   identify images received from multiple cameras at the common time;
   determine global intensities for portions of the identified images having common depth information;
   determine intensities for portions of an identified image having different depths based on shading information of the identified images;
   generate an energy of the identified image by combining the global intensities for portions of the identified images having various common depths with intensities based on shading information determined for the portions of the identified image; and
   modify depths of portions of the identified image to minimize the energy for the identified image.

3. The method of claim 2, wherein generate the energy of the identified image by combining the global intensities for portions of the identified images having various common depths with intensities based on shading information determined for the portions of the identified image further comprises:
   combine a regularization value with depth estimation for portions of the identified image having various common depths with depth estimation of one or more corresponding neighboring portions of the identified image.

4. The system of claim 1, wherein the console comprises multiple processors, each processor configured to receive an image from a camera at the common time, determine depth information for the image received from the camera and to modify depth information determined for the image received from the camera at the common time in parallel based on intensities of portions of each image having a common depth and intensities of portions of the image determined from shading information from each image.

5. The system of claim 4, wherein each processor comprises a graphics processing unit.

6. The system of claim 1, wherein the console is further configured to store the generated reconstruction of the object.

7. A method comprising:
   capturing images of an object positioned at a target position relative to a plurality of cameras, each camera capturing at least one image of the object;
   determining, in parallel, depth information for images captured from each of the plurality of cameras;
   modifying, in parallel, depth information determined for the images received from each of the plurality of cameras at a common time based on intensities of portions of each image having a common depth and intensities of portions of each image determined from shading information from each image; and
   generating a reconstruction of the object by combining the modified depth information for the images received from each of the plurality of cameras.

8. The method of claim 7, wherein modifying, in parallel, depth information determined for the images received from each of the plurality of cameras at the common time based on intensities of portions of each image having the common depth and intensities of portions of each image determined from shading information from each image comprises:
   identifying images received from multiple cameras at the common time;
   determining global intensities for portions of the identified images having common depth;
   determining intensities for portions of an identified image having different depths based on shading information of the identified images;
   generating an energy of the identified image by combining the global intensities for portions of the identified images having various common depths with intensities based on shading information determined for the portions of the identified image; and
   modifying depths of portions of the identified image to minimize the energy for the identified image.

9. The method of claim 8, wherein generating the energy of the identified image by combining the global intensities for portions of the identified images having various common depths with intensities based on shading information determined for the portions of the identified image further comprises:
   combining a regularization value with depth estimation for portions of the identified image having various common depths with depth estimation of one or more corresponding neighboring portions of the identified image.

10. The method of claim 7, wherein determining, in parallel, depth information for images captured by each of the plurality of cameras comprises:
determining depth information for images captured by different cameras at the common time in parallel, with different processors determining depth information for images captured by different cameras at the common time.

11. The method of claim 10, wherein modifying, in parallel, depth information determined for the images received from each of the plurality of cameras at the common time based on intensities of portions of each image having a common depth and intensities of portions of each image determined from shading information from each image comprises:
modifying depth information determined for images captured by different cameras at the common time in parallel, with different processors modifying determining depth information determined for images captured by different cameras at the common time.

12. The method of claim 7, further comprising:
storing the generated reconstruction of the object.

13. The method of claim 7, further comprising:
presenting the generated reconstruction of the object via a display device.

14. The method of claim 7, further comprising:
transmitting the generated reconstruction of the object to a client device.

15. A computer program product comprising a non-transitory, tangible computer readable storage medium having instructions encoded thereon that, when executed by a processor, cause the processor to:
obtain images of an object positioned at a target position relative to a plurality of cameras, each camera capturing at least one image of the object;
determine, in parallel, depth information for images captured from each of the plurality of cameras;
modify, in parallel, depth information determined for the images received from each of the plurality of cameras at a common time based on intensities of portions of each image having a common depth and intensities of portions of each image determined from shading information from each image; and
generate a reconstruction of the object by combining the modified depth information for the images received from each of the plurality of cameras.

16. The computer program product of claim 15, wherein modify, in parallel, depth information determined for the images received from each of the plurality of cameras at the common time based on intensities of portions of each image having the common depth and intensities of portions of each image determined from shading information from each image comprises:
identify images received from multiple cameras at the common time;
determine global intensities for portions of the identified images having common depth information;
determine intensities for portions of an identified image having different depths based on shading information of the identified images;
generate an energy of the identified image by combining the global intensities for portions of the identified images having various common depths with intensities based on shading information determined for the portions of the identified image; and
modify depths of portions of the identified image to minimize the energy for the identified image.

17. The computer program product of claim 16, wherein generate the energy of the identified image by combining the global intensities for portions of the identified images having various common depths with intensities based on shading information determined for the portions of the identified image comprises:
combine a regularization value, the global intensities for portions of the identified images having various common depths, and the intensities determined for the portions of the identified image having corresponding common depths.

18. The computer program product of claim 15, wherein determine, in parallel, depth information for images captured by each of the plurality of cameras comprises:
determine depth information for images captured by different cameras at the common time in parallel, with different processors determining depth information for images captured by different cameras at the common time.

19. The computer program product of claim 18, wherein modify, in parallel, depth information determined for the images received from each of the plurality of cameras at the common time based on intensities of portions of each image having a common depth and intensities of portions of each image determined from shading information from each image comprises:
modify depth information determined for images captured by different cameras at the common time in parallel, with different processors modifying determining depth information determined for images captured by different cameras at the common time.

20. The computer program product of claim 15, wherein the computer readable storage medium further has instructions encoded thereon that, when executed by the processor, cause the processor to:
store the generated reconstruction of the object.

* * * * *